United States Patent [19]
Castagnoli et al.

[11] Patent Number: 5,364,996
[45] Date of Patent: Nov. 15, 1994

[54] PARTIAL OXIDATION OF SCRAP RUBBER TIRES AND USED MOTOR OIL

[75] Inventors: Craig J. Castagnoli, Rowland Heights; Suk-Bae Cha, Longbeach; Hong P. Wang, Diamond Bar, all of Calif.

[73] Assignee: Texaco Inc., White Plains, N.Y.

[21] Appl. No.: 53,727

[22] Filed: Apr. 27, 1993

Related U.S. Application Data

[63] Continuation of Ser. No. 895,972, Jun. 9, 1992, abandoned.

[51] Int. Cl.$^5$ .............................................. C07C 1/00
[52] U.S. Cl. ................................... 585/241; 585/240; 208/407; 208/415; 208/427
[58] Field of Search ............. 585/240, 241; 208/407, 208/415, 427

[56] References Cited

U.S. PATENT DOCUMENTS

| | | | |
|---|---|---|---|
| 3,544,291 | 12/1970 | Schlinger et al. | 48/206 |
| 3,847,564 | 11/1974 | Marion et al. | 48/95 |
| 3,890,141 | 6/1975 | Crane et al. | 75/86 |
| 4,052,344 | 10/1977 | Crane et al. | 260/2.3 |
| 4,371,378 | 2/1983 | Brent et al. | 48/86 R |
| 4,384,150 | 5/1983 | Lyakhevich | 585/241 |
| 4,384,151 | 5/1983 | Audibert et al. | 585/241 |
| 4,525,175 | 6/1985 | Stellaccio | 48/86 R |
| 4,642,401 | 2/1987 | Coenen et al. | 585/241 |
| 4,983,278 | 1/1991 | Cha et al. | 208/407 |
| 5,070,109 | 12/1991 | Ulick et al. | 521/41 |

FOREIGN PATENT DOCUMENTS

| | | | |
|---|---|---|---|
| 2357636 | 7/1976 | France | 585/241 |
| 9014409 | 11/1990 | WIPO | 585/241 |

OTHER PUBLICATIONS

Grant Crane and Edward L. Kay, Scrap Tires Disposal Process, presented at a meeting of the Rubber Division, American Chemical Society, Philadelphia, Pa., Oct. 15–18, 1974.

*Primary Examiner*—Asok Pal
*Attorney, Agent, or Firm*—Jeffrey M. Greenman

[57] ABSTRACT

Scrap rubber automobile tires, oil soluble plastics, as well as waste motor oil are disposed of by the process of the subject invention without polluting the nation's environment. Further, useful product synthesis gas, reducing gas, or fuel gas is produced. The rubber from the rubber tires and/or oil soluble plastics are dissolved in the waste motor oil to produce a homogeneous pumpable tire-oil which is separated from undissolved tire belt material containing undissolved rubber and/or oily material, solid residue, and off-gas comprising light hydrocarbons having a maximum atmospheric boiling point of 850° F., and $H_2S$. The undissolved tire belt material is coked to produce off-gas, inorganic materials and carbon black. Off-gas form the liquefaction and coking reactors is cooled to produce organic condensate. The tire oil, carbon black, and condensate are mixed together and introduce into a partial oxidation gas generator for the production of synthesis gas, reducing gas, or fuel gas.

22 Claims, 1 Drawing Sheet

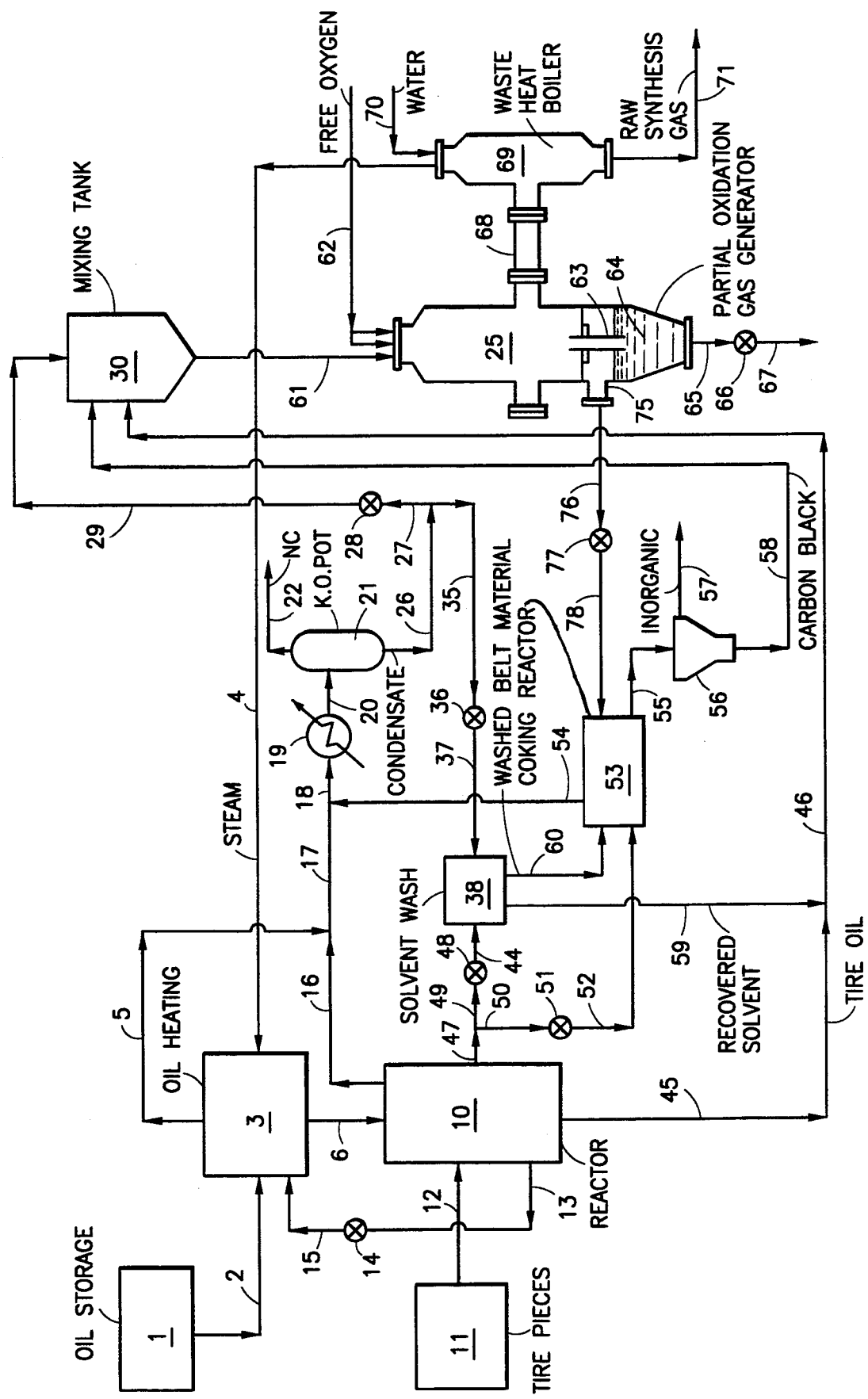

PARTIAL OXIDATION OF SCRAP RUBBER TIRES AND USED MOTOR OIL

This is a continuation of application Ser. No. 07/895,972 filed Jun. 9, 1992, and now abandoned.

FIELD OF THE INVENTION

This invention relates to the processing of rubber, oil soluble plastics, and rubber-containing material, such as used automobile and truck tires into a pumpable liquid hydrocarbonaceous feed to a partial oxidation gas generator for the production of raw synthesis gas, reducing gas, or fuel gas.

BACKGROUND OF THE INVENTION

The disposal of used rubber automobile and truck tires brings about difficult environmental problems that face all industrialized countries. This nation's pile of discarded tires has been estimated to be over three billion. Over about 200 million waste tires are generated annually in the United States.

In contrast with the subject invention, the processes described in U.S. Pat. Nos. 4,384,151 and 4,983,278 do not feet a liquid tire-oil fuel to a partial oxidation gas generator for the production of a gaseous mixture comprising $H_2+CO$. A slurry feed to a gasifier comprising a suspension of small pieces of rubber is mentioned in coassigned U.S. Pat. No. 4,371,378. However, such a material is significantly different from the subject invention wherein a homogeneous liquid tire-oil feed made by dissolving the rubber from rubber automobile or truck tires in a used motor oil solvent, in admixture with a light condensate oil and carbon black are fed to a partial oxidation gas generator.

SUMMARY OF THE INVENTION

This invention pertains to the partial oxidation of scrap rubber tires comprising the steps of:

(1) contacting a feed material selected from the group consisting of rubber, rubber-containing material, oil soluble plastics, and mixtures thereof with a pumpable hydrocarbonaceous liquid in a vented liquefaction reaction vessel in which the pressure is in the range of about 1 to 20 atmospheres; gradually increasing the temperature of said hydrocarbonaceous liquid from about 200° F. to a maximum temperature in the range of about 500° F. to 850° F., and contacting said feed material with said pumpable hydrocarbonaceous liquid at said maximum temperature until more than about 90 wt.% of the rubber and/or oil soluble plastic feed material has been dissolved in said hydrocarbonaceous liquid, wherein the following material (a) and (d) are produced:

(a) a pumpable heavy hydrocarbonaceous liquid containing about 20 to 80 weight percent of dissolved rubber and/or oil-soluble plastics;
(b) undissolved tire belt material selected from the group consisting of steel mesh, fiberglass, rayon, and mixtures thereof containing less than 10.0 wt.% of undissolved rubber and/or oily materials;
(c) solid residue; and
(d) off gas comprising light hydrocarbons having a maximum atmospheric boiling point of 850° F., and $H_2S$;

(2) introducing materials (1) (b) into a closed vented coking zone maintained at a temperature in the range of about 500° F. to 1500° F. and a pressure in the range of about 1 to 20 atmospheres in the absence of oxygen, and producing and separating the following materials: (a) off gas comprising light hydrocarbons having a maximum atmospheric boiling point of 850° F., (b) inorganic materials, and (c) carbon black;

(3) mixing off-gas (1)(d) from said reaction vessel in (1), and off gas (2)(a) from said coking zone in (2); and cooling said off-gas mixture to produce a liquid condensate and a separate stream of non-condensible fuel gas comprising $C_1$–$C_5$ hydrocarbons; and (4) introducing said pumpable heavy hydrocarbonaceous liquid form (1)(a) into the reaction zone of a partial oxidation gas generator along with at least a portion of said liquid condensate from (3) and said carbon black form (2) (c) and a free-oxygen containing gas and a temperature moderator and reacting said materials by partial oxidation at a temperature in the range of about 1800° F. to 3500° F. and a pressure in the range of about 1 to 300 atmospheres, an atomic ratio of O/C in the range of about 0.8 to 1.5, and a weight ratio of $H_2O$ to carbon in the range of about 0.2 to 3.0, thereby producing a hot raw effluent gas stream comprising $H_2$, $CO$, $CO_2$, $H_2O$, $H_2S$, and optionally $N_2$.

BRIEF DESCRIPTION OF THE DRAWING

The invention will be further understood by reference to the accompanying drawing. The drawing is a schematic representation of a preferred embodiment of the process.

DESCRIPTION OF THE INVENTION

Scrap rubber ties for example from automobiles, trucks, and buses, as well as waste lubricating oil are disposed of by the process of the subject invention without polluting the nation's environment. Further, useful product synthesis gas, reducing gas, fuel gas, and light fuel oil is produced.

Scrap rubber tires from automobiles, trucks and buses and other rubber-containing materials, oil soluble plastics and waste hydrocarbonaceous oils such as used motor oil are the feedstocks to the subject process. Substantially any form of vulcanized or un-vulcanized scrap or waste natural or synthetic rubber that will dissolve in a liquid hydrocarbon may be used. Synthetic rubber includes, for example, butadiene, isoprene, chloroprene and copolymers with styrene, alpha methyl styrene, divinyl benzene, ethylene, propylene, isobutylene, ethylenically unsaturated carboxylic acid, ester or nitrile, and others. Conventional rubber chemicals and compounding ingredients may be included in the rubber, such as pigments, softeners, vulcanizing and curing agents, anti-ozonants, and antioxidants. Reinforcing belts made from metal wire are usually molded into the rubber tires. There separation and removal from the rubber tires are relatively inexpensive by the subject process. Oil soluble plastics include, polyamides (nylon), polyesters (polyethyleneterephthate), polystyrene, cellulose acetate, polypropylene, and other thermoplastics dissolve in the liquid hydrocarbonaceous solvent along with the rubber. Rayon, fiberglass, and metal mesh materials will not dissolve in the liquid hydrocarbonaceous solvent. Rather, they are separated from the tire-oil by filtration or centrifuge.

The size of the rubber tires is preferably reduced to less than about 6"×2"×2" by means of commerically available cutting and shredding equipment.

The liquid hydrocarbonaceous solvent includes petroleum oils. Oils having the following properties are suitable: initial atmospheric boiling point, less than 550°

F., Neutralization No., mg KOH/g. 0.70 to 1.0, Aniline point °F. 100 to 110. Used hydrocarbon automobile motor oil is the preferably hydrocarbon solvent. Coaltar derived hydrocarbon oils may be used. Other, suitable oils comply with ASTM Specification D2226, Types 101 and 102.

In the subject process, the liquefaction reaction vessel is charged with a pumpable liquid hydrocarbonaceous liquid solvent, such as sued motor oil, at a temperature in the range of about 200° F. to 300° F. The pieces of rubber, rubber-containing material, oil-soluble plastics and mixtures thereof, such as whole or small pieces or automobile or truck tires are introduced into the reaction vessel. There are about 5 to 0.5 parts by wt. of oil solvent for each part by wt. of rubber, rubber-containing material oil soluble plastics, or mixture thereof. A small stream of the oil solvent is continuously removed form the bottom of the reaction vessel and pumped through an oil heater.

The heated oil solvent is then returned to the liquefaction reaction vessel. Recirculation and reheating of the oil is continued for about 15 to 90 minutes until a maximum temperature in the range of about 500° F. to 850° F. is reached. Each time that the oil solvent is recirculated through the oil heater, the temperature of the oil is increased an additional 50° F. to 250° F. That is, the temperature of the oil leaving the oil heater is about 50° F. to 250° F. greater than the oil entering the oil heater. After the maximum temperature is reached, the circulating oil continues to contact the rubber, rubber-containing material, oil soluble plastics and mixtures thereof until 90 to 100 wt.% of the materials dissolve in the pumpable circulating oil. For example, this will usually take an additional 15 to 90 minutes after the oil solvent reaches maximum temperature.

The subject liquefaction reactor with circulating hot oil solvent provides good heat transfer, minimum degradation and/or cracking of the oil solvent, in transit mixing and high solubility of the rubber, rubber-containing materials, and oil-soluble plastics. The pressure in the liquefaction reactor is in the range of about 1 to 20 atmospheres. The reaction takes place in the absence of oxygen. The gaseous materials leaving through the overhead vent line in the reactor vessel are cooled below the dew point and condensed. Liquids are produced, including gasoline, diesel oil, and light fuel oil, and are separated from non-condensible vapors in a knock out pot. From about 0 to 100 wt.%, such as about 25 to 75 wt.% of the condensate may be used as solvent. In one embodiment, this solvent is used to wash off undissolved rubber and sticky oil from metal belts and other non oil-soluble materials that are separated from a homogeneous pumpable heavy hydrocarbonaceous liquid that is produced in said liquefaction reactor. This hydrocarbonaceous liquid is also referred to herein as tire-oil. It contains about 20 to 80 weight percent of dissolved rubber and/or oil soluble plastics. The remainder of the condensate is sent to a mix tank prior to introduction into a conventional partial oxidation gas generator. The overhead from said knock out pot comprises non-condensed $C_4$, $C_5$ or less hydrocarbons with trace amounts of $H_2S$ and mercaptans. Butenes result from the break-up of styrene butadiene rubber polymer which is the main consitituent of tire rubber. These non-condensible gaseous materials may be used as a gaseous fuel for heating the used motor oil solvent or introduced directly into the partial oxidation gas generator.

Undissolved tire belt material selected from the group consisting of steel mesh, fiberglass, rayon, and mixtures thereof and containing about 1 to 10 wt.% of undissolved rubber and/or oily materials, along with solid residue comprising dirt, zinc oxide accelerator, and zinc sulfide pass directly into a coking reactor; and alternatively passes into a solvent wash step prior to entering the coking reactor. The expression A and/or B is used herein in its common form and means either A or B or mixtures of A and B. In an oxygen-free atmosphere in the coking reactor at a temperature in the range of about 500° F. to 1500° F. for about 30 to 90 minutes at atmospheric pressure, the aforesaid undissolved tire belt materials are converted into a gas and dry products. The dry products comprise carbon black, metal, and other inorganic substances in tires such as fiberglass. The composition of the gases which evolve during the coking reaction are similar to that of the off-gas from the liquefaction reactor. In the preferred embodiment, the off-gas from the coking reactor is mixed with the off-gas from the liquefaction reactor and processed in the manner described previously. Carbon black powder is separated from inorganic materials e.g. metal and fiberglass by means of a conventional magnetic separator, vibrating screen, air classifier, and combinations thereof and introduced into a mixing tank for preparing a feed to the partial oxidation gas generator. In one embodiment, the fiberglass is cut, sheared and mixed with the carbon black going into said mixing tank. In another embodiment, dried or pressed municipal sewage sludge and/or other burnable waste material is introduced into the mixing tank along with said other materials for preparation of a slurry feed to the partial oxidation gas generator.

A suitable partial oxidation gas generator is shown and described in coassigned U.S. Pat. No. 3,544,291, which is incorporated hereby by reference. A three or four stream annular type burner, such as shown and described in coassigned U.S. Pat. Nos. 3,847,564 and 4,525,175, which are incorporated herein by reference, may be used to introduce the feedstreams into the partial oxidation gas generator.

The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

The relative proportions of the feedstreams to the gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. Preferably the temperature in the gasifier is in the range of about 2200° F. to 2800° F. Further, the weight ratio of $H_2O$ to carbon in the feed is in the range of about 0.2 to 3.0, such as about 1.0 to 2.0. The atomic ratio of free-oxygen to carbon in the feed is in the range of about 0.8 to 1.4, such as about 1.0 to 1.2. Advantageously, the high amount of combined oxygen in the sewage sludge reduces the amount of free-oxygen.

The dwell time in the reaction zone is in the range of about 1 to 10 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0.01 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon ash, or molten slag are contained in the effluent gas stream. Depending on the composition and use, the effluent gas stream is called synthesis gas, reducing gas, or fuel gas.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in gas cooler. The gas stream may be cleaned and purified by conventional methods. For example, reference is made to coassigned U.S. Pat. No. 4,052,176, which is included herein by reference for removal of $H_2S$, COS, and $CO_2$.

In one embodiment, a portion of the synthesis gas product at a temperature in the range of about 400° F. to 1500° F. is introduced into the coking reactor as a carrier gas and to accelerate the cooling reaction. About 0.5 to 1.5 lbs, say 1.0 lb of syngas may be used to process each lb of residual tire belt material.

DESCRIPTION OF THE DRAWING

A more complete understanding the invention may be had by reference to the accompanying drawing which illustrates a preferred embodiment of the invention. It is not intended to limit the subject invention to the particular process or materials described.

Used motor oil in oil storage tank 1 is passed through line 2 into oil heater 3 where it is heated by indirect heat exchanger with steam from line 4 and/or by an oil or gas fired heater. Flue gas from the oil heaters pass through line 5. Oil at a temperature in the range of about 200° F. to 300° F. is passed through line 6 into closed liquefaction reactor 10. Pieces of rubber tires about 6"×2"×2" in storage hopper 11 are passed through line 12 into reactor 10. There they are contacted by said hot oil and are heated. The hot process oil is continuously recirculated between oil heater 3 and liquefaction reactor 10 by way of line 13, valve 14 and line 15 to oil heater 3 where the oil is heated by indirect heat exchange with steam, or by burning oil or gas and they through line 6. With each pass through oil heater 3, the temperature of the process oil is increased about 50° F. to 250° F. The recirculation of the oil is thereby gradually brought up to maximum temperature in the range of about 500° F. to 850° F. The recirculation of the oil is continued at the maximum temperature until at least 90 wt.% of the rubber and/or oil soluble plastic is dissolved in the oil and a pumpable homogeneous tire-oil is produced. About 1 to 10 wt.% of the rubber remains undissolved and attached to the metal belt material that separate out in the reactor. A slow moving rotary stirrer in reactor 10 helps to separate the belt material from the rubber. During the liquefaction step, the evolved gases are passed through vent line 15 and mixed in line 7 with the vented flue gas form line 5. The mixture of gases in line 18 are cooled to the dew point in cooler 19. The mixture of condensate and non-condensible gases in line 20 are separated in knock out pot 21. Non-condensible gases in line 22 at the top of knock out pot 21 may be treated to remove $H_2S$ and either utilized elsewhere in the process to provide process heat, injected into partial oxidation gasifier 25 as a portion of the feed, or flared. From about 0 to 100 wt.% of the condensate leaving through line 26 at the bottom of knock out pot 21 may be passed through line 27, valve 28, and line 29 into mixing tank 30. The remainder is introduced into solvent wash 38. In one embodiment from about 10 to 100 wt.% of the condensate in line 26 is passed through line 35, valve 36, line 37 into solvent wash zone 38. The remainder is introduced into mixing tank 30.

The homogeneous tire oil produced in reactor 10 is passed through screening means (not shown) near the bottom of reactor 10 and is then passed through lines 45 and 46 into mixing tank 30. An oily solids stream, comprising belting material such as metal and fiberglass as well as residual rubber material and adhered tire oil which is separated from the tire oil by said screening means leaves reactor 10 through line 47. With valve 48 in line 49 closed, the oily solids is passed through line 50, open valve 51, line 52, and into coking reactor 53. Organic vapors are produced in coking reactor 53 and leave through vent line 54. They are mixed in line 18 with the mixture of organic vapors from line 17 and are processed in the manner described previously. The dry materials leaving coking reactor 53 through line 55 are passed into a conventional separating means 56. Conventional vibrating screens, magnetic separators, or air classifiers may be used for separating means 56. For example, the inorganic materials e.g. metal belts, fiberglass leave separating means 56 through line 57, and the carbon black leaves through line 58.

In one embodiment, prior to being introduced into coking reactor 53, which valve 51 closed and valve 48 open, the oily belt materials from liquefaction reactor 10 is passed through lines 47, 49, valve 48 and line 44 into solvent wash zone 38. The oily belts may be cleaned by a portion of the condensate solvent form line 37. In one embodiment, steam from waste heat boiler 69 may be used to clean the oily belts. The recovered condensate solvent in line 59 is mixed in line 46 with the tire-oil from line 45 and introduced into mixing tank 30. The washed metal belt material in line 60 in introduced into coking reactor 53 for further cleaning.

The tire-oil, with or without admixture with recovered solvent in line 46, is introduced into mix tank 30 along with carbon black and with or without crushed fiberglass from line 58 and with or without condensate from line 29. The mixture of materials is passed through line 61 and an intermediate passage of an annular type burner (not shown) into a conventional partial oxidation gas generator 25. Free-oxygen containing gas, optionally in admixture with a temperature moderator e.g. steam, in line 62 passes through the central and outer passages of said burner. The partial oxidation reaction takes place in the refractory line reaction zone in gas generator 25.

The raw syntheses or fuel gas in split so that a portion e.g. about 25 to 75 mole % of the raw synthesis or fuel gas stream with entrained slag passes down through dip tube 63 and into quench water 64. Slag separates from the gas stream and leaves through line 65, valve 66, and line 67. The remainder of the raw synthesis or fuel gas is passed through side outlet 68 into waste heat boiler 69. Boiler feed water in line 70 is converted into steam by indirect heat exchange with the raw synthesis gas in waste heat boiler 69. The steam is then passed through one 4 and introduced into a heat exchanger in 3 to heat the used motor oil feed, as previously described. The partially cooled raw synthesis or fuel gas leaves through line 71. After purification to remove acid gases e.g. $H_2S$, COS and $CO_2$, the synthesis gas is used for chemical synthesis. Depending upon its composition e.g. high methane contact in addition to $H_2 + CO$, the gas stream may be used as fuel gas, for example as the fuel in oil heater 3.

In one embodiment, the quenched portion of raw synthesis gas is passed through side outlet 75, line 76, valve 77, and line 78 into coking reactor 53 where it helps to maintain a reducing atmosphere, aids the coking reaction, and sweeps the gaseous products from the coking reaction through vent line 54.

EXAMPLE 49.5 lbs. of used motor oil at a temperature of 250° F. are introduced into a liquefaction reactor filled with tire oil and containing 50 lbs of pieces of rubber tires. Simultaneously, 49.5 lbs of used motor oil are removed from the reactor and recirculated to an oil heater where its temperature is increased about 100° F. to 300° F. The heated tire oil is then reintroduced into the liquefaction reactor where it directly contacts the tire pieces. Recirculation of the motor oil between the reactor and the oil heater is continued until the motor oil reaches a temperature of about 750° F., and then for an additional hour at 750° F. During this period, about 95 wt.% of the rubber tires dissolves in the motor oil to produce 65 lbs of homogeneous pumpable tire-oil. During this stage, 14.5 lbs of organic vapors are separated and removed from the liquefaction reactor. About 20 lbs of unreacted oily belt materials are separately removed from the liquefaction reactor and sent to a coking reactor. The oily belt material is reacted in the coking reactor in an air-free atmosphere at a temperature of about 950° F. at atmospheric pressure. Synthesis gas produced in an integrated synthesis gas generator may be introduced into the coking reactor to improve the coking reaction. About 10 lbs of organic vapors are passed through the vent line of the coking reactor, mixed with 14.5 lbs of off-gas from the liquefaction reactor, cooled and condensed, and separated into 22.0 lbs of condensate and 2.5 lbs of non-condensible gas. Both the condensate and the non-condensible gases are introduced into the partial oxidation reactor as fuel. The dry materials in the coking reactor are separated by a vibrating screen to produce 5 lbs of carbon black and 5 lbs of inorganic fiberglass and other solid materials.

The following materials derived from the process are mixed together and introduced into the reaction zone of a partial oxidation gas generator for the production of syngas. There they are reacted with a free-oxygen containing gas e.g. air in admixture with $H_2O$ to produce synthesis gas: tire oil—65 lbs, carbon black—5 lbs, and condensate derived from the overhead from the liquefaction and coking reactors—22.5 lbs.

The hot raw synthesis gas is passed through a waste heat boiler to produce steam. A portion of the steam is used to heat up the used motor oil solvent.

Although modifications and variations of the invention may be made without departing from the spirit and scope thereof, only such limitations should be imposed as are indicated in the appended claims.

We claim:

1. A partial oxidation process comprising:
   (1) contacting a feed material selected from the group consisting of rubber, rubber-containing material, oil soluble plastics, and mixtures thereof with a pumpable hydrocarbonaceous liquid in a vented liquefaction reaction vessel in which the pressure is in the range of about 1 to 20 atmospheres, gradually increasing the temperature of said hydrocarbonaceous liquid form about 200° F. to a maximum temperature in the range of about 500° F. to 850°F., and contacting said feed material with said pumpable hydrocarbonaceous liquid at said maximum temperature until more than about 90 wt.% of the rubber and/or oil soluble plastic feed material has been dissolved in said hydrocarbonaceous liquid, wherein the following materials (a) to (d) are produced:
   (a) a pumpable heavy hydrocarbonaceous liquid containing about 20 to 80 weight percent of dissolved rubber and/or oil-soluble plastics;
   (b) undissolved tire belt material selected from the group consisting of steel mesh, fiber-glass, rayon, and mixtures thereof containing less than 10 wt.% of undissolved rubber and/or oily materials;
   (c) solid residue; and
   (d) off gas comprising light hydrocarbons having a maximum atmospheric boiling point of 850° F., and $H_2S$;
   (2) introducing materials (1)(b) into a closed vented coking zone maintained at a temperature in the range of about 500° F. to 1500° F. and a pressure in the range of about 1 to 20 atmospheres in the absence of oxygen, and producing and separating the following materials: (a) off gas comprising light hydrocarbons having a maximum atmospheric boiling point of 850° F., (b) inorganic materials, and (c) carbon black;
   (3) mixing off gas (1)(d) from said reaction vessel in (1) and off gas (2)(a) from said coking zone in (2); and cooling said off gas mixture to produce a liquid condensate and a separate stream of non-condensible fuel gas comprising $C_1$-$C_3$ hydrocarbons;
   (4) introducing said pumpable heavy hydrocarbonaceous liquid from (1)(a) into the reaction zone of a partial oxidation gas generator along with at least a portion of said liquid condensate from (3) and said carbon black from (2)(c) by way of a first passage in an annular-type burner comprising a central conduit and inner and outer coaxial concentric annular passages surrounding said central conduit, passing non-condensible fuel gas from (3) through a second passage in said burner, and passing a stream of free-oxygen containing gas and a temperature moderator through a third passage in said burner; wherein said streams impact each other and atomize, and reacting said materials by partial oxidation at a temperature in the range of about 1800° F. to 3500° F. and a pressure in the range of about 1 to 300 atmospheres, an atomic ratio of O/C in the range of about 0.8 to 1.5, and a weight ratio of $H_2O$ to carbon in the range of about 0.2 to 3.0, thereby producing a hot raw effluent gas stream comprising $H_2$, CO, $CO_2$, $H_2O$, $H_2S$, and optionally $N_2$; and
   (5) passing said hot raw effluent gas stream from (4) in indirect heat exchange with $H_2O$ thereby producing steam, and heating said hydrocarbonaceous liquid for use in (1) with said steam to the temperature specified in (1).

2. The process of claim 1 provided with the steps of continuously recirculating said hydrocarbonaceous liquid in step (1) between said liquefaction reaction vessel and an oil heating zone where the temperature of the hydrocarbonaceous liquid leaving said oil heating zone is about 50° F. to 250° F. greater than the temperature of the hydrocarbonaceous liquid entering said oil heating zone until said maximum temperature is reached; and maintaining contact in said liquefaction reaction vessel between said hydrocarbonaceous liquid at said maximum temperature and said rubber and/or oil soluble plastic feed material for a period in the range of about 15 to 90 minutes.

3. The process of claim 1, wherein a stream of said heavy hydrocarbonaceous liquid (1)(a) in admixture with liquid condensate from (4) and carbon black (3)(c) is introduced into a partial oxidation generator in (5) by way of a first passage in a three-stream annular-type burner comprising a central conduit and inner and outer coaxial concentric annular passages surrounding said central conduit; a stream of said non-condensible fuel gas from (4) is passed through a second passage in said burner; and a stream of said free-oxygen containing gas in admixture with a temperature moderator is passed through the third passage in said burner; wherein said three streams impact each other, atomize, and react together by partial oxidation in said reaction zone.

4. The process of claim 1 wherein said first passage is said outer annular passage, said second passage is said inner annular passage, and said third passage to said central conduit.

5. The process of claim 1 where in (1) the weight ratio of hydrocarbonaceous liquid to rubber and/or oil soluble plastic materials is in the range of about 5.0–0.5 to 1.

6. The process of claim 1 wherein said rubber containing material comprises rubber tires and the rubber in said rubber tires is selected from the group consisting of natural rubber, synthetic rubber, and mixtures thereof.

7. The process of claim 1 wherein said hydrocarbonaceous liquid is selected from the group consisting of used hydrocarbon automobile motor oil, coal-tar derived hydrocarbon oil, and mixtures thereof.

8. The process of claim 1 provided with the step of washing off said tire belt material (1)(b) with at least at portion of said liquid condensate from (3) to produce condensate washings.

9. The process of claim 8 wherein at least a portion of said condensate washings is introduced into said reaction zones in (1) and/or (4).

10. The process of claim 1 wherein a portion of said hot raw effluent gas stream from (4) is introduced into said coking zone in (2).

11. The process of claim 1 provided with the step of introducing municipal sewage sludge and/or other burnable waste material into said partial oxidation gas generator in (4) in addition to said other materials.

12. The process of claim 1 wherein said hydrocarbonaceous liquid is petroleum oil having the following properties: initial atmospheric boiling point less than 550° F., Neutralization No., mg KOH/g 0.70 to 1.0, Aniline point °F. 100 to 110.

13. The process of claim 1 wherein said hydrocarbonaceous liquid complies with ASTM Specification D2226, Types 101 and 102.

14. The process of claim 1 provided with introducing material (1)(c) into said coking zone in (2) along with said material (1)(b).

15. A partial oxidation process comprising:
(1) contacting a feed material comprising rubber-containing automobile and/or truck tires with a pumpable hydrocarbonaceous liquid in a vented liquefaction reaction vessel in which the pressure is in the range of about 1 to 20 atmospheres, and the weight ratio of hydrocarbonaceous liquid to rubber-containing material is in the range of about 5.0–0.5 to 1.0; gradually increasing the temperature of said hydrocarbonaceous liquid from about 200° F. to a maximum temperature in the range of about 500° F. to 850° F., and contacting said feed material with said pumpable hydrocarbonaceous liquid at said maximum temperature until more than about 90 wt.% of the rubber feed material has been dissolved in said hydrocarbonaceous liquid, wherein the following materials (a) to (d) are produced:
  (a) a pumpable heavy hydrocarbonaceous liquid containing about 20 to 80 weight percent of dissolved rubber;
  (b) undissolved tire belt material selected from the group consisting of steel mesh, fiber-glass, rayon, and mixtures thereof containing less than 10 wt.% of undissolved rubber and/or oily materials;
  (c) solid residue; and
  (d) off gas comprising light hydrocarbons having a maximum atmospheric boiling point of 850° F., and $H_2S$;
(2) cleaning material (1)(b) and (1)(c) by washing said material with a portion of the liquid condensate from (4) to produce condensate washings;
(3) introducing cleaned materials (1)(b) and (1)(c) from (2) into a closed vented coking zone maintained at a temperature in the range of about 500° F. to 1500° F. and a pressure in the range of about 1 to 20 atmospheres in the absence of oxygen, and producing and separating the following materials: (a) off gas comprising light hydrocarbons having a maximum atmospheric boiling point of 850° F., (b) inorganic materials, and (c) carbon black;
(4) mixing off gas (1)(d) from said reaction vessel in (1) and off gas (3)(a) from said coking zone in (3); and cooling said off gas mixture to produce a liquid condensate and a separate stream of non-condensible fuel gas comprising $C_1$–$C_3$ hydrocarbons;
(5) introducing said pumpable heavy hydrocarbonaceous liquid containing dissolved rubber from (1)(a) into the reaction zone of a partial oxidation gas generator in admixture with condensate washings from (2) and said liquid condensate from (4) and and said carbon black from (3)(c); and reacting said materials in said gas generator by partial oxidation with a free-oxygen containing gas in the presence of a temperature moderator at a temperature in the range of about 1800° F. to 3500° F. and a pressure in the range of about 1 to 300 atmospheres, an atomic ratio of O/C in the range of about 0.8 to 1.5, and a weight ratio of $H_2O$ to carbon in the range of about 0.2 to 3.0; thereby producing a hot raw effluent gas stream comprising $H_2$, $CO$, $CO_2$, $H_2O$, $H_2S$, and optionally $N_2$; and
(6) introducing a portion of said hot raw effluent gas stream from (5) into said coking zone in (3) to accelerate the coking reaction.

16. The process of claim 15, wherein said hydrocarbonaceous liquid in (1) is heated to said temperature range in (1) by indirect heat exchange with steam and/or in an oil or gas fired heater.

17. The process of claim 15 wherein said hydrocarbonaceous liquid in (1) is used hydrocarbon motor oil.

18. The process of claim 15 wherein said hydrocarbonaceous liquid in (1) is petroleum oil having the following properties: initial atmospheric boiling point less than 550° F., Neutralization No., mg KOH/g 0.70 to 1.0, Aniline point °F. 100 to 110.

19. The process of claim 15 wherein said hydrocarbonaceous liquid in (1) complies with ASTM Specification D2226, Types 101 and 102.

20. The process of claim 15 wherein a portion of the condensate washings form (2) is introduced into the liquefaction reaction zone in (1).

21. The process in claim 15 provided with the steps of separating fiberglass form said solid residue material 1(c), and introducing said fiberglass into said partial oxidation reaction zone in (5) along with said carbon black.

22. The process of claim 15 provided with the steps of cooling, cleaning and purifying said hot raw effluent gas stream from (5).

* * * * *